(12) United States Patent
Fujiyama et al.

(10) Patent No.: US 6,284,858 B1
(45) Date of Patent: Sep. 4, 2001

(54) SILICONE COMPOUNDS AND PROCESS FOR PRODUCING THE SAME

(75) Inventors: Takeshi Fujiyama; Nobuyuki Furukawa; Takero Teramoto, all of Kawasaki (JP)

(73) Assignees: Nippon Steel Chemical Co., Ltd.; Nippon Steel Corporation, both of Tokyo (JP)

(*) Notice: Subject to any disclaimer, the term of this patent is extended or adjusted under 35 U.S.C. 154(b) by 0 days.

(21) Appl. No.: 09/381,045
(22) PCT Filed: Mar. 16, 1998
(86) PCT No.: PCT/JP98/01098
§ 371 Date: Sep. 14, 1999
§ 102(e) Date: Sep. 14, 1999
(87) PCT Pub. No.: WO98/41566
PCT Pub. Date: Sep. 24, 1998

(30) Foreign Application Priority Data

Mar. 14, 1997 (JP) ................................. 9-060904

(51) Int. Cl.$^7$ .................................................. C08G 77/04
(52) U.S. Cl. ................................. 528/12; 528/33; 528/38; 528/43; 525/474; 525/477; 556/425; 556/429; 556/455; 556/462
(58) Field of Search .................. 528/12, 33, 38, 528/43; 525/474, 477; 556/462, 455, 429, 425

(56) References Cited

U.S. PATENT DOCUMENTS 3,017,386 * 1/1962 Brown et al. .

FOREIGN PATENT DOCUMENTS

| 516144 A1 | * 12/1992 | (EP) . |
|---|---|---|
| 4015989 | 7/1965 | (JP) . |
| 5011197 | 2/1975 | (JP) . |
| 5011198 | 2/1975 | (JP) . |
| 5011199 | 2/1975 | (JP) . |
| 50139900 | 11/1975 | (JP) . |
| 53088099A | 8/1978 | (JP) . |
| 570120 57A | 1/1982 | (JP) . |
| 57018729A | 1/1982 | (JP) . |
| 592137 28A | 12/1984 | (JP) . |
| 60110726 A | 6/1985 | (JP) . |
| 61221232A | 10/1986 | (JP) . |
| 62215944A | 9/1987 | (JP) . |
| 630134 46A | 1/1988 | (JP) . |
| 2032356 | 2/1990 | (JP) . |
| 3281616A | 12/1991 | (JP) . |
| 4033936A | 2/1992 | (JP) . |
| 4185641 | 7/1992 | (JP) . |
| 4185641A | 7/1992 | (JP) . |
| 4353521 | 12/1992 | (JP) . |
| 4353521A | 12/1992 | (JP) . |
| 7070321A | 3/1995 | (JP) . |

OTHER PUBLICATIONS

John F. Brown, Jr., Journal of Polymer Science, Part C, No. 1, pp. 83–97 (1963).

* cited by examiner

Primary Examiner—Robert Dawson
Assistant Examiner—Jeffrey B Robertson
(74) Attorney, Agent, or Firm—Birch, Stewart, Kolasch & Birch, LLP

(57) ABSTRACT

This invention relates to silicone compounds in which terminal SiO of cage-type and/or ladder-type polyphenylsilsesquioxanes is wholly or partly linked to a triorganosilyl group containing reactive functional group X and also relates to a process for preparing said silicone compounds by subjecting cage-terminated and silanol-free cage-type and/or ladder-type polyphenylsilsesquioxanes to an equilibrium reaction under heat with disiloxanes containing reactive functional group X of the following structural formula

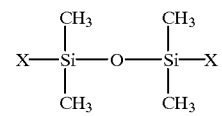

in an organic solvent in the presence of an alkaline rearrangement and condensation catalyst. This invention provides silicone compounds containing terminal reactive functional groups of excellent storage stability and properties of good reproducibility such as heat resistance.

2 Claims, 11 Drawing Sheets

SILICONE COMPOUNDS AND PROCESS FOR PRODUCING THE SAME

This application is the national phase under 35 U.S.C. §371 of PCT International Application No. PCT/JP98/01098 which has an International filing date of Mar. 16, 1998 which designated the United States of America.

FIELD OF TECHNOLOGY

This invention relates to silicone compounds and a process for preparing the same and, more particularly, to polyphenylsilsesquioxanes in which SiO at the end of the molecular chain is linked wholly or partly to a triorganosilyl group containing reactive functional group X and a process for preparing the same.

BACKGROUND TECHNOLOGY

Polyphenylsilsesquioxanes are used in such applications as coating materials, sealing materials, and interlayer insulation membranes on account of their excellent heat resistance and electrical insulation.

Examples of such polyphenylsilsesquioxanes are cage octaphenylsilsesquioxane prepared by hydrolyzing phenyltrichlorosilane in an organic solvent into phenyltrihydroxysilane and polycondensing the hydrolysis product under heat in an anhydrous solvent in the presence of an alkaline rearrangement and condensation catalyst, phenylsiloxane prepolymers of low intrinsic viscosity prepared by separating the aforementioned cage octaphenylsilsesquioxane and polymerizing it under heat again in the presence of an alkaline rearrangement and condensation catalyst, and phenylsilsesquioxanes of high intrinsic viscosity prepared by further polymerizing the aforementioned prepolymers under heat in the presence of an alkaline rearrangement and condensation catalyst [Japan Tokkyo Koho Sho 40-15,989 (1965), Japan Kokai Tokkyo Koho Sho 50-139,990 (1975), and J. Polymer Sci., Part C, No. 1, pp 83–97 (1963)].

Ladder polyorganosiloxanes with their side chains partly modified by introduction of reactive functional groups are disclosed, for example, in Japan Kokai Tokkyo Koho Hei 3-281,616 (1991), Japan Kokai Tokkyo Koho Hei 4-33,936 (1992), and Japan Kokai Tokkyo Koho Sho 62-215,944 (1987). Moreover, polyorganosilsesquioxanes in which the hydrogen atoms of the silanol groups are wholly or partly replaced with a triorganosilyl group are described in Japan Kokai Tokkyo Koho Sho 61-221,232 (1986), Japan Kokai Tokkyo Koho Hei 2-32,356 (1990), Japan Kokai Tokkyo Koho Hei 4-185,641 (1992), Japan Kokai Tokkyo Koho Hei 4-353,521 (1992), and EURO. PAT. No. 0516144A1. Many of these disclosures aim mainly at improving the storage stability of ladder polyorganosilsesquioxanes by deactivation of the terminal silanol groups (there is still a room for argument about whether it is terminal group or internal defect) or terminating the polycondensation of polyorganosilsesquioxanes by addition of a silylating agent for control of the molecular weight, that is, effecting end-capping.

The following procedures are known for end-capping: polyorganosilsesquioxanes containing unreacted silanol groups are first synthesized and then allowed to react with a triorganochlorosilane in the presence of an alkali catalyst such as pyridine to effect dehydrochlorination or, in a similar manner, polyorganosilsesquioxanes containing silanol groups are allowed to react with an organomonoisocyanatosilane [Japan Kokai Tokkyo Koho Sho 61-221,232 (1986) and Japan Kokai Tokkyo Koho Sho 63-13,446 (1988); polyorganosilsesquioxanes containing terminal hydroxyl groups are synthesized purposefully and allowed to react either with a triorganomonoalkoxysilane to effect dealkanolation [Japan Kokai Tokkyo Koho Sho 57-12,057 (1982) and Japan Kokai Tokkyo Koho Sho 60-110,726 (1985)] or with a triorganomonochlorosilane to effect dehydrochlorination [Japan Kokai Tokkyo Koho Sho 59-213,728 (1984); hydroxyl-terminated polyorganosilsesquioxanes are allowed to react with a hexaorganodisilazane [EURO. PAT. No. 0516144A1 and Japan Kokai Tokkyo Koho Hei 4-353,521 (1992). It is also known that methylsilsesquioxanes containing terminal hydroxyl or alkoxy groups are trimethylsilylated by treating with hexamethyldisiloxane in the presence of an acid catalyst [Japan Kokai Tokkyo Koho Hei 7-70,321 (1995).

As mentioned above, a variety of procedures are known for linking reactive functional groups of a different kind to the side chain or end of a molecular structure. Nearly all of them, however, are based on initial synthesis of ladder polyorganosilsesquioxanes containing hydroxyl groups (silanol groups) in the side chain or at the end followed by reaction with compounds containing functional groups reactive with the hydroxyl groups such as chlorosilanes, alkoxysilanes, isocyanatosilanes, and disilazanes. However, the polyorganosilsesquioxanes thus synthesized contain a small amount of silanol groups which have not contributed to polymerization or the aforementioned reaction and remain as defect or branched structure and this causes such problems as lowering of mechanical properties, heat resistance and loss of storage stability.

Now, a procedure based on the initial formation of cage or ladder polyorganosilsesquioxanes end-capped with a cage structure and the subsequent direct introduction of functional groups solely at the end would conceivably give polymers that hardly contain silanol groups inside as branched structure and that show excellent storage stability and properties of good reproducibility such as heat resistance. This procedure, however, is subject to the following restrictions in the course of synthesis.

The synthesis of cage or ladder polyorganosilsesquioxanes based on hydrolysis of an organotrichlorosilane followed by polymerization in the presence of an alkaline rearrangement and condensation catalyst as described in the aforementioned Japan Tokkyo Koho Sho 40-15,989 (1965) and Japan Kokai Tokkyo Koho Sho 50-139,900 (1975) gives polymers that terminate in a cage structure and are virtually devoid of hydroxyl groups as disclosed in Japan Kokai Tokkyo Koho Sho 57-18,729 (1982) and Japan Kokai Tokkyo Koho Sho 59-213,728 (1984); hence, the aforementioned procedure for introducing reactive functional groups solely to the end cannot be adopted here. In consequence, the preparation of hydroxyl-terminated polyorganosilsesquioxanes has been greatly restricted as it requires either the use of special chloroformate esters and carbodiimides as catalysts or the adoption of any one of the procedures disclosed in Japan Kokai Tokkyo Koho Sho 50-11,197 (1975), Japan Kokai Tokkyo Koho Sho 50-11,198 (1975), Japan Kokai Tokkyo Koho Sho 50-11,199 (1975), and Japan Kokai Tokkyo Koho Sho 53-88,099 (1978).

Under these circumstances, it is an object of this invention to provide polyorganosilsesquioxanes of excellent storage stability and properties of good reproducibility such as heat resistance which are free of silanol groups as defect and branched structure inside and possess reactive functional groups at the ends and to provide a simple and commercially viable process for preparing polyorganosilsesquioxanes without having recourse to hydroxyl-terminated polyorganosilsesquioxanes.

The present inventors have conducted studies to accomplish the aforementioned objective, found that an equilibrium reaction between cage-terminated and hydroxyl-free polyorganosilsesquioxanes and functional group-containing disiloxanes in the presence of an alkaline catalyst readily yields polyorganosilsesquioxanes containing terminal reactive functional group X, and completed this invention.

DISCLOSURE OF THE INVENTION

Silicone compounds of this invention are silanol-free cage and/or ladder polyphenylsilsesquioxanes represented by the following general formula (1)

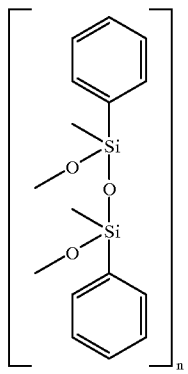

(1)

(wherein n is an integer from 2 to 5000) with terminal SiO being wholly or partly linked to reactive functional group X represented by the following general formula (2)

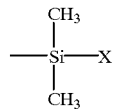

(2)

[wherein X is a substituent selected from (A) to (F) shown below, $R_3$ is an alkylene group containing 1 to 3 carbon atoms, and $R_4$ is hydrogen or methyl group].

(A) $CH_2=CH-$
(B) $CH_2=C(R_4)-COO-R_3-$
(C)

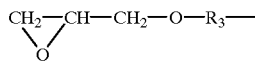

$-CH_2-O-R_{3б1}-$ (D) $H_2N-R_3-$
(E) $HO-R_3-$
(F) $HS-R_3-$

The process for preparing silicone compounds of this invention comprises effecting an equilibrium reaction of cage-terminated and silanol-free cage and/or ladder polyphenylsilsesquioxanes with functional group-containing disiloxanes represented by the following general formula (3)

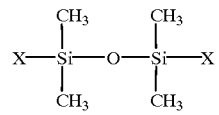

(3)

[wherein X is defined as in the aforementioned general formula (2)] under heat in the presence of an alkaline rearrangement and condensation catalyst.

A mode of the practice of this invention will be described concretely below.

Silicone compounds of this invention have a structural formula of cage and/or ladder polyphenylsilsesquioxanes represented by the aforementioned general formula (1) with their terminal SiO being linked wholly or partly to a triorganosilyl group containing reactive functional group X represented by the general formula (2) and normally have a weight average molecular weight $M_w$ of 800 to 1,000,000 as determined by Gel Permeation Chromatography (GPC) with polystyrene as standard.

Concrete examples of the structural formulas of such silicone compounds are shown below: structural formula (4) for cage polymer, structural formula (5) for ladder polymers, and structural formula (6) for unilaterally cage-terminated ladder polymers.

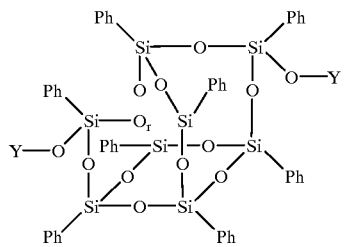

(4)

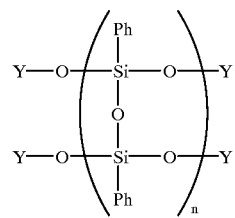

(5)

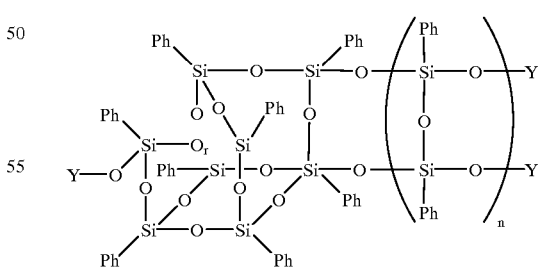

(6)

In the structural formulas (4) to (6), Y is a triorganosilyl group containing reactive functional group X represented by the aforementioned general formula (2) and n is the same as in the aforementioned general formula (1).

This invention includes a mixture of two kinds or more, particularly a mixture of three kinds, of these structures depending upon the preparatory conditions, especially upon the mix ratio of disiloxanes and end-capped cage and/or ladder polyphenylsilsesquioxanes at the time of equilibrium reaction.

In the aforementioned example where cage octaphenylsilsesquioxane is used as a starting material and cesium hydroxide (CsOH) as an alkaline catalyst, the disiloxane compound of higher reactivity (higher solubility in alkali) depolymerizes and forms an active species by the addition of $Cs^+$ to $SiO^-$ and this silanolate anion nucleophilically attacks a terminal Si atom of the cage octaphenylsilsesquioxane and links itself to one end. The chain transfer proceeds where the active species moves from the cage polymer to the disiloxane (the reverse is also possible) and the result is a cage structure containing a reactive functional group at one or both ends. A further progress of chain growth (a cage polymer opens to form a ladder polymer with an increase in molecular weight) yields cage-terminated ladder polyphenylsilsesquioxanes that have a cage structure at one end and reactive functional groups at part of the other end. A still further progress of chain growth yields ladder polyphenylsilsesquioxanes containing reactive functional groups at all ends.

The aforementioned equilibrium reaction proceeds while a cage structure, a unilaterally cage-terminated ladder structure, and a ladder structure are mixed together and, as is the case with any equilibrium reaction, the reaction finally reaches an equilibrium point and yields a mixture of a certain composition depending upon the mix ratio (concentration) of cage (or ladder) polymers and disiloxane, the temperature, and the concentration of alkali. The aforementioned chain growth and chain transfer reactions can be terminated by stopping heating and allowing the reaction temperature to fall down to room temperature. The reaction mixture is then poured into a solvent, for example, an alcohol such as methanol and ethanol, a hydrocarbon such as hexane, or acetonitrile to precipitate the product. In this manner, the object ladder and/or cage polyphenylsilsesquioxanes containing terminal reactive functional groups are separated from the unreacted materials and catalyst and purified.

In executing the process of this invention for preparing silicone compounds, the following compounds prepared as described in the aforementioned Japan Tokkyo Koho Sho 40-15,989 (1965) and elsewhere are used as cage-terminated and silanol-free cage and/or ladder polyphenylsilsesquioxanes; cage octaphenylsilsesquioxane prepared by hydrolyzing phenyltrichlorosilane to phenyltrihydroxysilane in an organic solvent and heating in the presence of an alkaline rearrangement and condensation catalyst, silanol-free ladder phenylpolysiloxane prepolymers, and cage-terminated ladder phenylsilsesquioxanes prepared by further polymerizing the foregoing two in the presence of an alkaline rearrangement and condensation catalyst.

Disiloxanes to be used in this invention contain reactive functional group X represented by the aforementioned general formula (3), X being any one of (A) to (F). An example of such disiloxanes is a compound represented by the general formula (3) in which X is (B) and it can be prepared readily by hydrosilylating allyl methacrylate with dimethylchlorosilane in the presence of chloroplatinic acid as catalyst followed by hydrolysis and condensation.

Alkaline rearrangement and condensation catalysts to be used in this invention include the following compounds that are generally used for the synthesis of ladder and/or cage polyphenylsilsesquioxanes; alkali metal hydroxides such as cesium hydroxide, potassium hydroxide, sodium hydroxide, and rubidium hydroxide, ammonium hydroxide salts such as tetramethylammonium hydroxide, tetraethylammonium hydroxide, benzyltrimethylammonium hydroxide, and benzyltriethylammonium hydroxide, and tetraorganophosphonium compounds such as tetrabutylphosphonium hydroxide and tetraethylphosphonium hydroxide.

Ammonium hydroxide salts are chosen in applications such as electronic materials that cannot tolerate residual alkali metal ions. Where the equilibrium reaction is carried out at a temperature of 130° C. or more to reduce the reaction time, alkali metal hydroxides are preferred because ammonium hydroxide salts decompose at the temperature and cesium hydroxide is favored on account of its high reactivity. The catalyst in question is added preferably in an amount ranging from 0.01% to 20% by weight of the raw material disiloxane. Addition of 0.01% by weight or less gives the object product in an extremely small yield. On the other hand, addition of 20% by weight or more causes ladder and/or cage polyphenylsilsesquioxanes to undergo a side reaction, that is, a polymerization of their own, to an appreciable extent and also makes it difficult to perform the separation and purification of the object product from such by-products and the catalyst by precipitation.

Organic solvents useful for this invention include benzene, toluene, xylene, ethylene glycol dimethyl ether, N-methyl-2-pyrrolidone, o-dichlorobenzene, diphenyl ether, 1,4-dioxane, acetone, methyl ethyl ketone, methyl isobutyl ketone, ethyl acetate, butyl acetate, ethyl acetoacetate, ethylene glycol monomethyl ether, propylene glycol monomethyl ether, cyclohexane, benzonitrile, methyl phenyl ether, mesitylene, durene, m-dimethoxybenzene, biphenyl, chlorobiphenyl, and chlorobenzene.

A procedure desirable for the practice of this invention is to choose a nonpolar solvent such as benzene, toluene, and xylene as an organic solvent and effect an equilibrium reaction of cage octaphenylsilsesquioxane of low solubility with a disiloxane of high solubility in this solvent in the presence of an alkaline catalyst such as cesium hydroxide and tetramethylammonium hydroxide. Then, the cage octaphenylsilsesquioxane dissolves in the solvent as it undergoes silylation and the progress of the reaction and the end point of the reaction are easy to observe. In addition, the unreacted cage octaphenylsilsesquioxane is readily separated from the object product by filtration.

The equilibrium reaction of ladder and/or cage polyphenylsilsesquioxanes represented by the general formula (1) with a disiloxane represented by the general formula (3) in the presence of an alkaline catalyst proceeds according to the reaction mechanism described as an example earlier. This means that the equilibrium reaction is in a competitive relationship with the ring opening or further polymerization of ladder and/or cage polyphenylsilsesquioxanes by themselves and it is necessary to carry out the former as preferentially as possible. The reaction in this invention is fundamentally an equilibrium reaction and it follows from this that the weight average molecular weight $M_w$, yield, and rate of formation of the object ladder and/or cage polyphenylsilsesquioxanes containing terminal reactive functional groups are determined automatically by such factors as the reaction temperature, reaction time, mix ratio of raw materials added, and amount of alkaline catalyst. It is therefore desirable to carry out the equilibrium reaction under the following conditions.

The ratio by weight of the amount added (A) of cage and/or ladder polyphenylsilsesquioxanes to the amount added (B) of a disiloxane compound preferably satisfies the relationship $0.01 \leq B/A \leq 100$, more preferably $0.01 \leq B/A \leq 10$. Where B/A is 0.01 or less, virtually no reactive functional groups are introduced and a side reaction of polymerization of the raw material polymers themselves takes place preferentially. Where B/A is 100 or more, cage and/or ladder polyphenylsilsesquioxanes containing terminal reactive functional groups are synthesized preferentially in high yield, but their molecular weight $M_w$ is relatively low because the chain growth reaction becomes hindered between polyphenylsilsesquioxanes to which reactive functional groups have been introduced partly and the unreacted polyphenylsilsesquioxanes. Hence, the latter weight ratio is unfavorable for preparing polymers of high molecular weight. Moreover, the disiloxane tends to remain unreacted in a large quantity in the reaction system and this makes it difficult to perform separation and purification of the object product by precipitation.

The equilibrium reaction in this invention generally tends to proceed at higher rate in higher yield when carried out at higher temperature because of higher solubility of an alkaline catalyst in siloxane linkage. Conversely, the difference in the reactivity toward the alkaline catalyst between disiloxane and ladder and/or cage polyphenylsilsesquioxanes decreases and the reaction selectivity decreases. That is, a side reaction is induced in which ladder and/or cage polyphenylsilsesquioxanes polymerize by themselves. In consequence, the reaction temperature is preferably set in the range from 60 to 200° C., more preferably from 100 to 150° C. Some kinds of terminal functional groups in the disiloxane, for example, epoxy and methacryl, are known to polymerize by themselves at a too high reaction temperature and, in such cases, it is necessary to control the reaction temperature and, as needed, to add a polymerization inhibitor. The reaction time varies somewhat with the reaction temperature and agitating efficiency and is preferably 1 to 72 hours in the aforementioned temperature range in order to bring the equilibrium reaction satisfactorily to the intended level.

The process of this invention makes it possible to synthesize directly polyphenylsilsesquioxanes containing terminal reactive functional groups by submitting cage octaphenylsilsesquioxane that is obtained by hydrolyzing phenyltrichlorosilane into phenyltrihydroxysilane in an organic solvent and polycondensing under heat with the use of an alkaline rearrangement and condensation catalyst, silanol-free ladder phenylsiloxane prepolymers, or cage-terminated ladder phenylsilsesquioxanes obtained by further polymerizing the foregoing two with the use of an alkaline rearrangement and condensation catalyst to an equilibrium reaction with disiloxanes containing reactive functional groups under heat in an organic solvent in the presence of an alkaline rearrangement and condensation catalyst and the process is applicable for introduction of a variety of reactive functional groups. The ladder and/or cage polyphenylsilsesquioxanes synthesized in this manner possess structures represented by the structural formulas (4) to (6) free of internal silanol groups as defect and branched structure and show excellent storage stability and properties of good reproducibility such as heat resistance.

PREFERRED EMBODIMENTS OF THE INVENTION

This invention will be described below with reference to the examples.

The ladder, silanol-free ladder, and cage-terminated ladder octaphenylsilsesquioxanes used in the following examples have been prepared according to the procedures described in the following supplementary examples.

SUPPLEMENTARY EXAMPLE 1

Synthesis of Ladder Octaphenylsilsesquioxane

The synthesis in this example follows the procedure described in Japan Tokkyo Koho Sho 40-15,989 (1965) for the preparation of cage octaphenylsilsesquioxane having a structural formula of $(C_6H_5SiO_{3/2})_8$.

In 500 cc of benzene was dissolved 105 g (0.5 mole) of phenyltrichlorosilane and the solution was reacted with water until completion of the hydrolysis. The hydrolysis product was washed with water, 16.6 cc (0.03 mole) of commercially available 30% benzyltrimethylammonium hydroxide solution, and the mixture was heated at reflux temperature for 4 hours. The mixture was then cooled and left standing for about 96 hours. The slurry obtained after this period was again heated at reflux temperature for 24 hours, cooled, and filtered to give about 75 g of cage octaphenylsilsesquioxane of the aforementioned structural formula.

Figure 1:
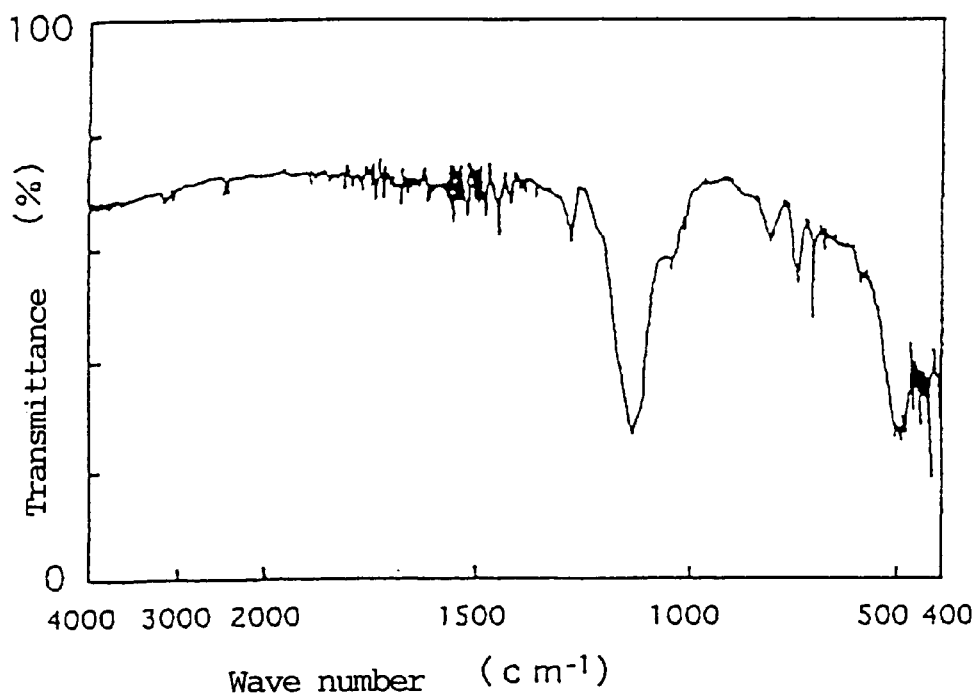
FIG. 1 is the infrared absorption spectrum of the cage octaphenylsilsesquioxane obtained in Supplementary Example 1.
Figure 2:
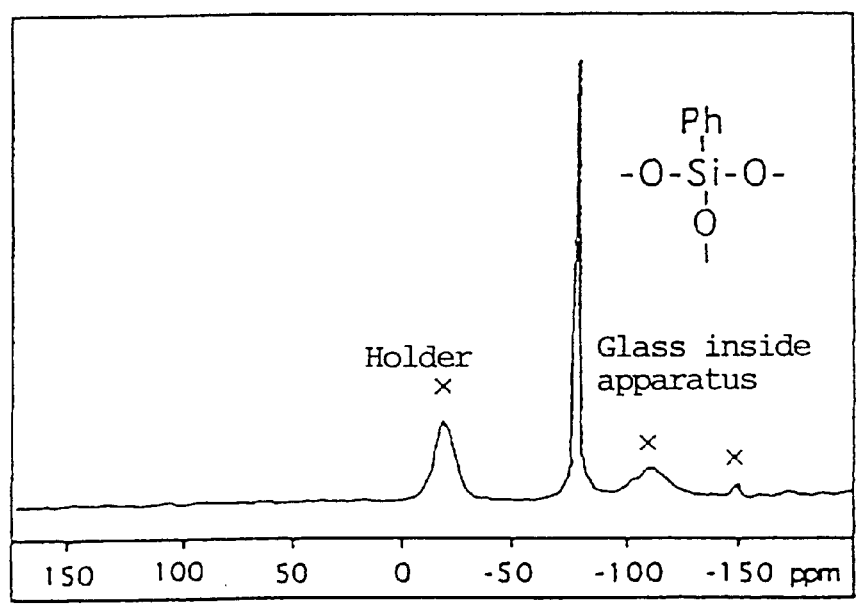
FIG. 2 is the $^{29}$Si-MAS·NMR spectrum of the cage octaphenylsilsesquioxane obtained in Supplementary Example 1.

The infrared absorption spectrum was determined and, as shown in FIG. 1, absorption bands assignable to Si—$C_6H_5$ were observed at 1595 cm$^{-1}$ and 1430 cm$^{-1}$, an absorption band assignable to the antisymmetric stretch vibration of Si—O—Si at 1135 cm$^{-1}$, and no band assignable to Si—OH at 3400 cm$^{-1}$. The $^{29}$Si-MAS·NMR spectrum was determined and, as shown in FIG. 2, a sharp signal assignable to Si nuclei in cage octaphenylsilsesquioxane was observed at −77 ppm.

Signals assignable to an Si nucleus linked to hydroxyl group described in J. Polymer Sci., Part A, Vol. 33, pp 55–62 (1995) were not observed at −70 ppm and −62 ppm.

SUPPLEMENTARY EXAMPLE 2

Synthesis of Silanol-free Ladder Phenylsiloxane Prepolymers

The synthesis in this example follows the procedure described in Japan Tokkyo Koho Sho 40-15,989 (1965) for the preparation of silanol-free ladder phenylpolysiloxane prepolymers. A solution of about 500 parts of phenyltrichlorosilane in 500 parts of toluene was added slowly to 2,000 parts of water with stirring. The acid layer was separated and the resin layer existing as toluene solution was submitted to azeotropic distillation to remove the residual water and HCl. Thereafter, KOH was added in an amount corresponding to about 0.078% of the calculated weight of hydroxyl-free phenylpolysiloxane, and the toluene solution was refluxed with stirring for 9 hours to give silanol-free ladder phenylpolysiloxane prepolymers. The prepolymers obtained as syrup made up about 50.3% of the toluene solution and had a repeating unit of $C_6H_5SiO_{1.5}$. Isolation of the prepolymers as solid was carried out as follows. The toluene solution of the prepolymers was diluted with about 1.5 times its weight of mineral spirit (boiling point 156–196° C., KB value approximately 37), the resulting slurry was stirred vigorously for about 10 minutes, filtered, and the solid was dried in air for about 16 hours and then at 150° C. for 4 hours.

Figure 3:
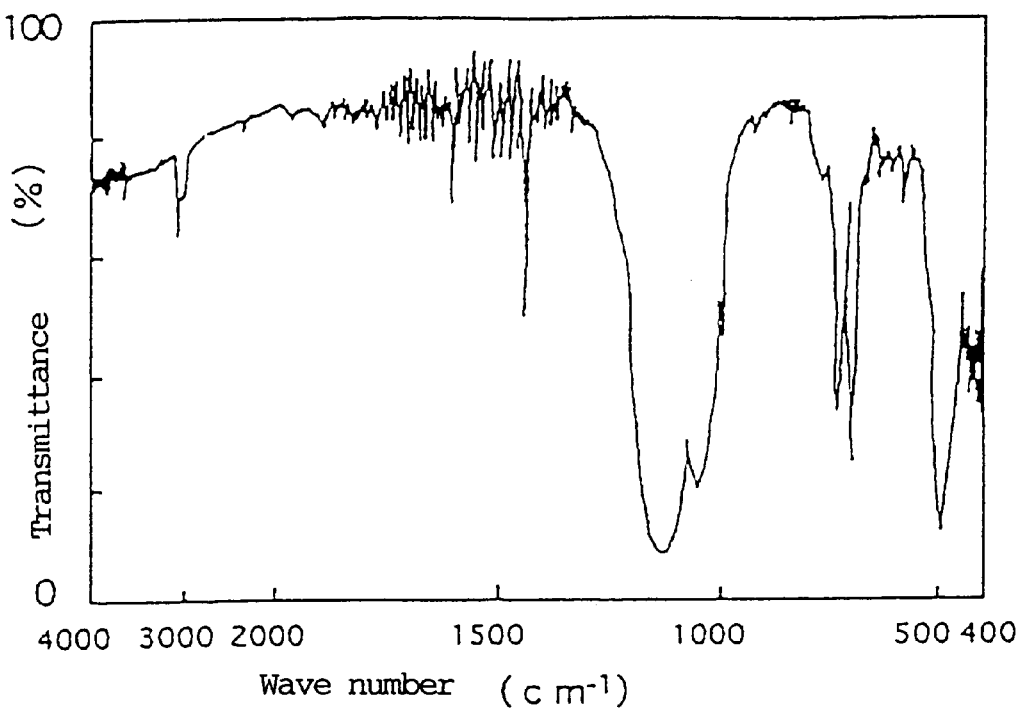
FIG. 3 is the infrared absorption spectrum of the ladder phenylpolysiloxane prepolymers obtained in Supplementary Example 2.
Figure 4:
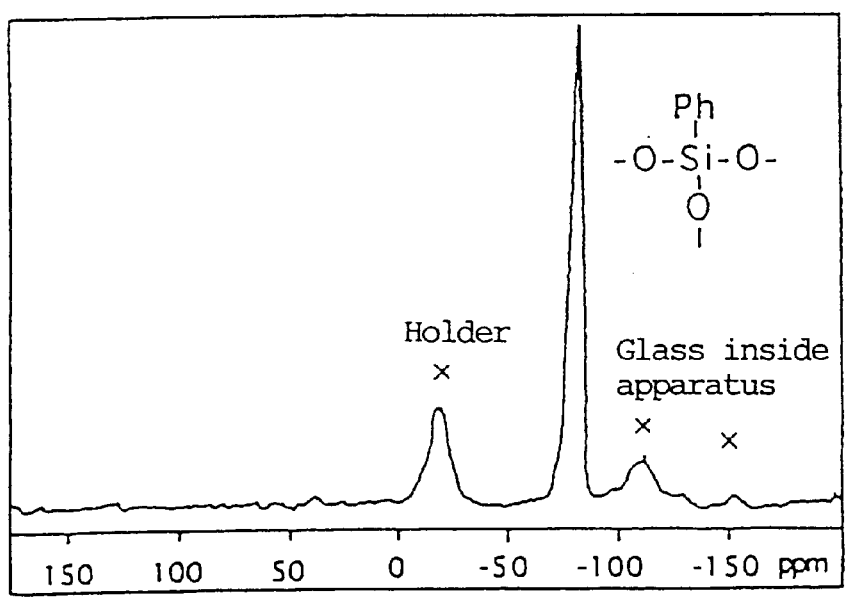
FIG. 4 is the $^{29}$Si-MAS·NMR spectrum of the ladder phenylpolysiloxane prepolymers obtained in Supplementary Example 2.

The infrared absorption spectrum of the prepolymers was determined and, as shown in FIG. 3, absorption bands assignable to Si—$C_6H_5$ were observed at 1595 cm$^{-1}$ and 1430 cm$^{-1}$, absorption bands assignable to the antisymmetric stretch vibration of Si—O—Si which indicates a ladder structure for the prepolymers at 1135 cm$^{-1}$ and 1045 cm$^{31}$ 1, and no absorption band assignable to Si—OH at 3400 cm$^{-1}$. The $^{29}$Si-MAS·NMR was determined and, as shown in FIG. 4, a somewhat broad signal assignable to Si nuclei in ladder phenylpolysiloxane prepolymers was observed at −77 ppm and no signal assignable to an Si nucleus linked to hydroxyl group at −70 ppm and −62 ppm.

SUPPLEMENTARY EXAMPLE 3

Synthesis of Cage-terminated Ladder Phenylsilsesquioxanes

The synthesis in this example follows the procedure described in Japan Tokkyo Koho Sho 40-15,989 (1965) for the preparation of cage-terminated ladder phenylsilsesquioxanes. In a reaction vessel were placed 20 parts of the cage octaphenylsilsesquioxane prepared in Supplementary Example 1, 261 parts of o-dichlorobenzene, and 0.01 part of potassium hydroxide and the mixture was heated at reflux temperature (180–190° C.) for about 1 hour until a homogeneous solution was obtained. The solution was cooled to room temperature, and about 1,000 parts of n-hexane was added to give silanol-free ladder phenylpolysiloxane prepolymers. About 5 parts of the prepolymers containing about 0.03% of the potassium hydroxide was dissolved in a solvent composed of 2.5 parts of biphenyl and 2.5 parts of benzene, the solution was heated at 100–125° C. to evaporate the greater part of the benzene, the mixture of the residual solvent and the prepolymers was heated at about 250° C. for 2 hours to effect polymerization while enough care was exercised to prevent escape of the solvent (by covering the apparatus). An alkaline catalyst required for this polymerization was not added freshly here because some of the potassium hydroxide remaining after the conversion of $(C_6H_5SiO_{3/2})_8$ to prepolymers could be utilized as such catalyst. One part by volume of the reaction mixture containing cage-terminated ladder phenylsilsesquioxanes was dissolved in about 10 parts by volume of benzene and mixed with glacial acetic acid in an amount sufficient to neutralize the potassium hydroxide. Precipitation by methanol followed by drying in vacuum gave cage-terminated ladder polyphenylsilsesquioxanes with an intrinsic viscosity of 1.08 dl/g.

The infrared absorption spectrum of the polymers thus obtained was determined and absorption bands assignable to Si—$C_6H_5$ were observed at 1595 cm$^{-1}$ and 1430 cm$^{-1}$, absorption bands assignable to the antisymmetric stretch vibration of Si—O—Si which indicates a ladder structure for the prepolymers at 1135 cm$^{-1}$ and 1045 cm$^{-1}$, and no absorption band assignable to Si—OH at 3400 cm$^{-1}$. The $^{29}$Si—MAS·NMR spectrum was determined and a somewhat broad signal assignable to Si nuclei in ladder phenylpolysiloxane prepolymers was observed at −77 ppm and no signal assignable to an Si nucleus linked to hydroxyl group at −70 ppm and −62 ppm.

EXAMPLE 1

In a reaction vessel were placed 8 parts by weight of the cage octaphenylsilsesquioxane prepared in Supplementary Example 1, 8 parts by weight of 1,3-bis(3-methacryloyloxypropyl)-1,1,3,3-tetramethyldisiloxane, 32 parts by weight of toluene, 0.16 part by weight of cesium hydroxide, and 0.03 part by weight of a polymerization inhibitor (Methoquinone manufactured by Seiko Kagaku) and the mixture was heated at reflux temperature with vigorous stirring for 7 hours. White powders of the cage octaphenylsilsesquioxane did not dissolve in the toluene at first, but they gradually dissolved as the reaction progressed and dissolved completely after 7 hours. The solution was cooled to room temperature, the insoluble unreacted cesium hydroxide was removed by filtration, and the filtrate was poured into 500 parts by weight of methanol to precipitate methacryl-terminated silylated polyphenylsilsesquioxanes. The precipitate was collected by filtration and dried in vacuum to give 14 parts by weight of methacryl-terminated cage silylated polyphenylsilsesquioxanes of a single structure as white solid.

Figure 5:
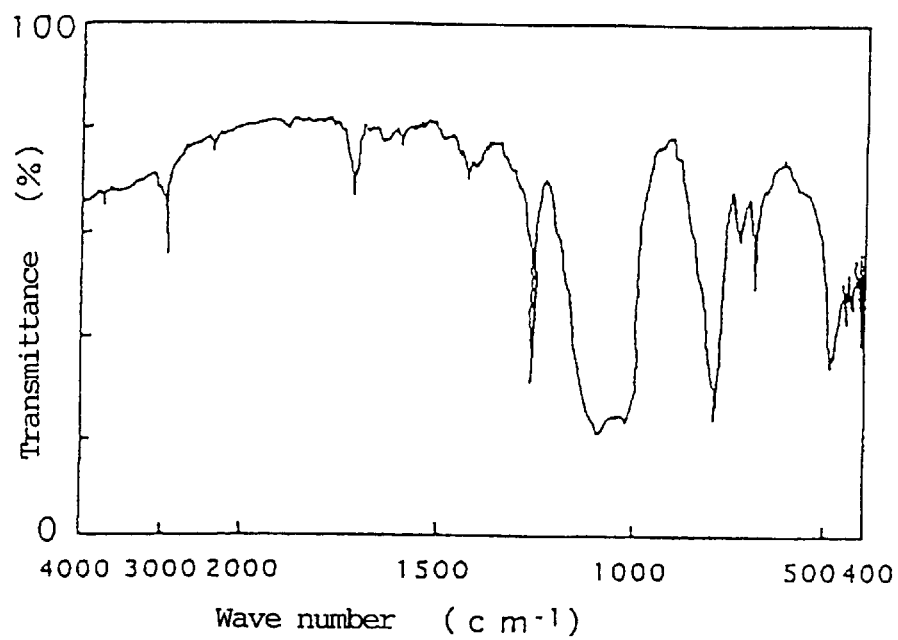
FIG. 5 is the infrared absorption spectrum of the cage octaphenylsilsesquioxane containing methacryl group obtained in Example 1 of this invention.

The weight average molecular weight $M_w$ of the product was approximately 1,500 when determined by GPC with polystyrene as standard. The infrared absorption spectrum of the product was determined by the KBr tablet method and, as shown in FIG. 5, absorption bands assignable to Si—$C_6H_5$ were observed at 1595 cm$^{-1}$ and 1430 cm$^{-1}$ while absorption bands assignable to the antisymmetric stretch vibration of Si—O—Si were observed at 1135 cm$^{-1}$ and 1020 cm$^{-1}$. This indicates that a small portion of the obligomers in question assumes a ladder structure and most of them a cage structure. No absorption band assignable to Si—OH was observed at 3400 cm$^{-1}$.

Figure 6:
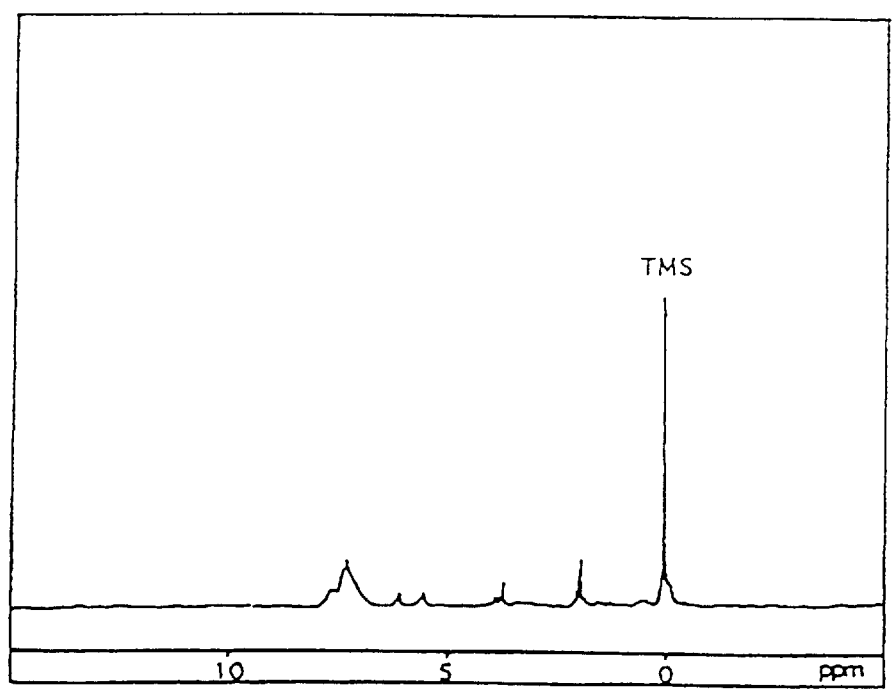
FIG. 6 is the $^1$H-NMR spectrum of the cage octaphenylsilsesquioxane containing methacryl group obtained in Example 1 of this invention.
Figure 7:
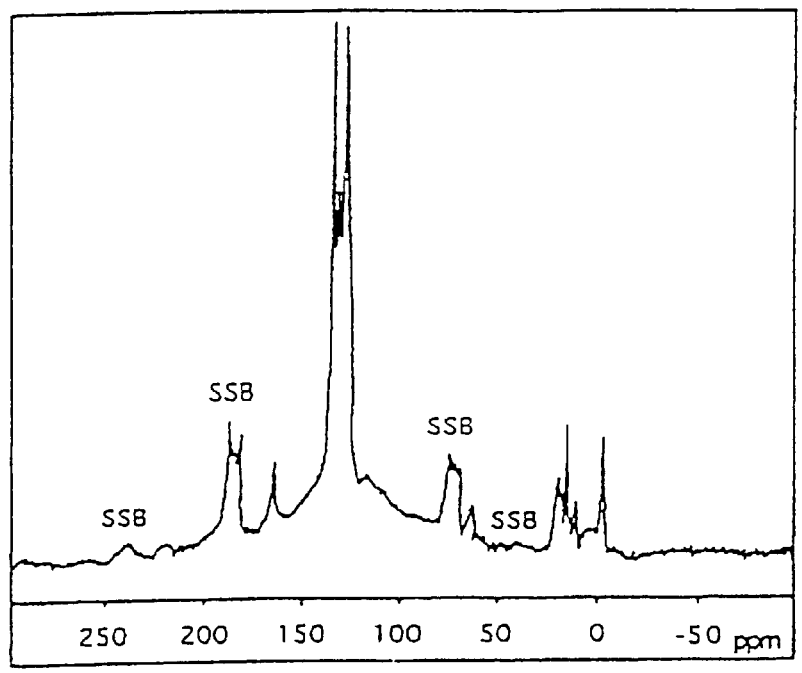
FIG. 7 is the $^{13}$C-MAS·NMR spectrum of the cage octaphenylsilsesquioxane containing methacryl group obtained in Example 1 of this invention.
Figure 8:
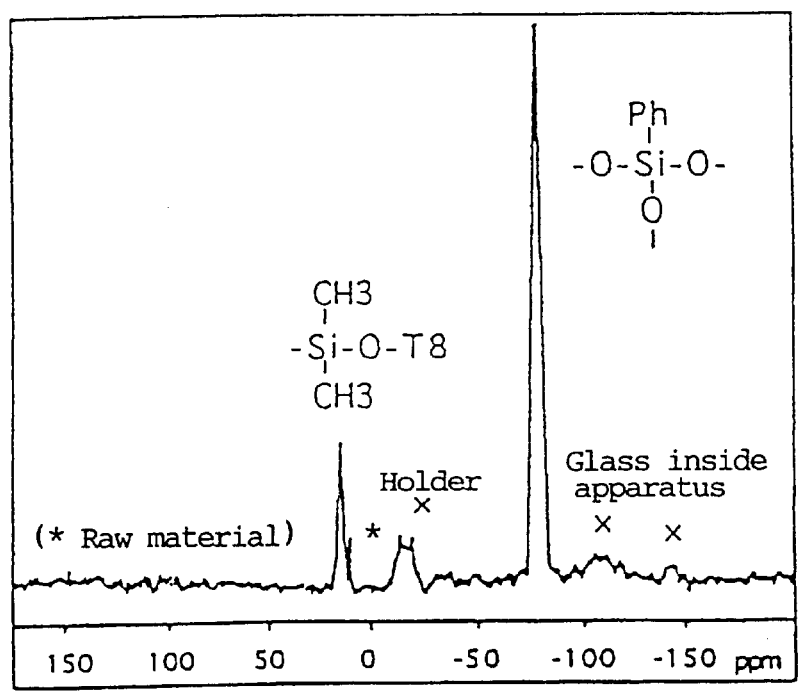
FIG. 8 is the $^{29}$Si-MAS·NMR spectrum of the cage octaphenylsilsesquioxane containing methacryl group obtained in Example 1 of this invention.

The $^1$H-NMR and $^{13}$C-MAS·NMR spectra were determined and, as shown in FIGS. 6 and 7, signals of nuclei of H and C in the 3-methacryloyloxypropyldimethylsilyl and phenyl groups were observed. Moreover, the $^{29}$Si—MAS·NMR spectrum was determined and, as shown in FIG. 8, a signal of the Si nucleus in 3-methacryloyloxypropyldimethylsilyl and that of Si nuclei in cage octaphenylsilsesquioxane were observed respectively at 10.9 ppm and 79.2 ppm at an intensity ratio of 2:8, and, in addition, a signal of Si nuclei in the raw material 1,1,3,3-tetramethyl-1,3-di(3-methacryloyloxypropyl) disiloxane remaining unremoved by precipitation was observed at 7.7 ppm. No signals for Si which is linked to hydroxyl were observed at −70 ppm and −62 ppm.

EXAMPLE 2

In a reaction vessel were placed 100 parts by weight of the cage octaphenylsilsesquioxane prepared in Supplementary Example 1, 50 parts by weight of 1,3-bis(3-methacryloyloxypropyl)-1,1,3,3-tetramethyldisiloxane, 200 parts by weight of xylene, 2 parts by weight of cesium hydroxide, and 0.5 part by weight of a polymerization inhibitor (Methoquinone manufactured by Seiko Kagaku) and the mixture was heated at reflux temperature with vigorous stirring for 22 hours. The resulting solution was cooled to room temperature, the insoluble unreacted cesium hydroxide and cage octaphenylsilsesquioxane were removed by filtration, and the filtrate was poured into 3,000 parts by weight of methanol to precipitate methacryl-terminated silylated polyphenylsilsesquioxanes. The precipitate was collected by filtration and dried in vacuum to give 72 parts by weight of methacryl-terminated ladder silylated polyphenylsilsesquioxanes as white solid.

Figure 9:
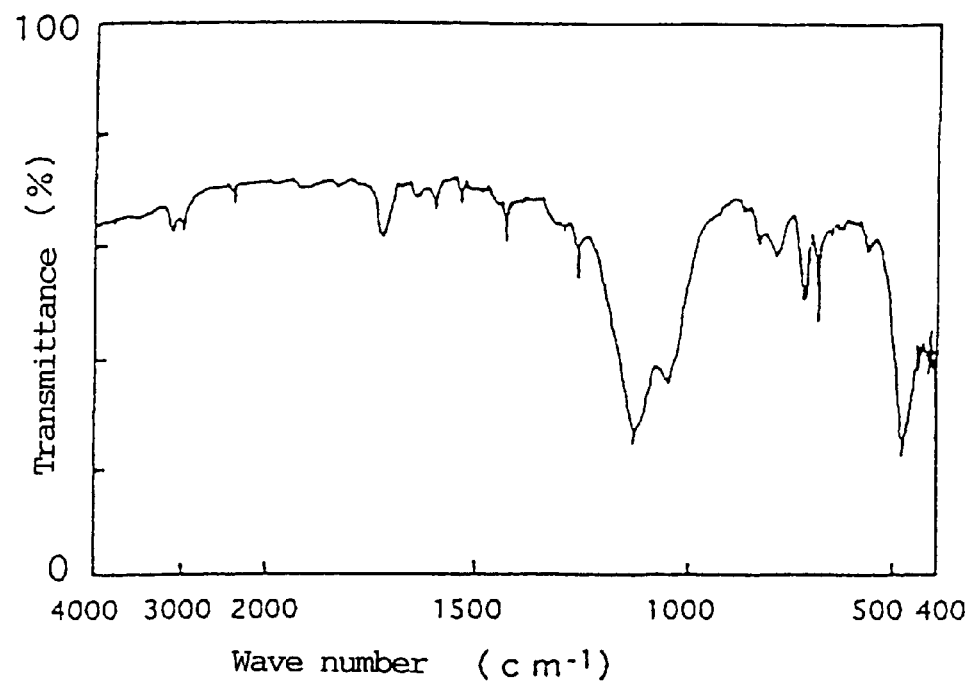
FIG. 9 is the infrared absorption spectrum of the ladder polyphenylsilsesquioxanes containing methacryl group obtained in Example 2 of this invention.

The weight average molecular weight $M_w$ of the product was approximately 4,000 when determined by GPC with polystyrene as standard. The infrared absorption spectrum was determined by the KBr tablet method and, as shown in FIG. 9, absorption bands assignable to Si—$C_6H_5$ were observed at 1595 cm$^{-1}$ and 1430 cm$^{31\ 1}$ while absorption bands assignable to the antisymmetric stretch vibration of Si—O—Si which indicates predominance of a ladder structure for the oligomers in question were observed at 1135 cm$^{-1}$ and 1045 cm$^{-1}$. No absorption band assignable to Si—OH was observed at 3400 cm$^{-1}$.

Figure 10:
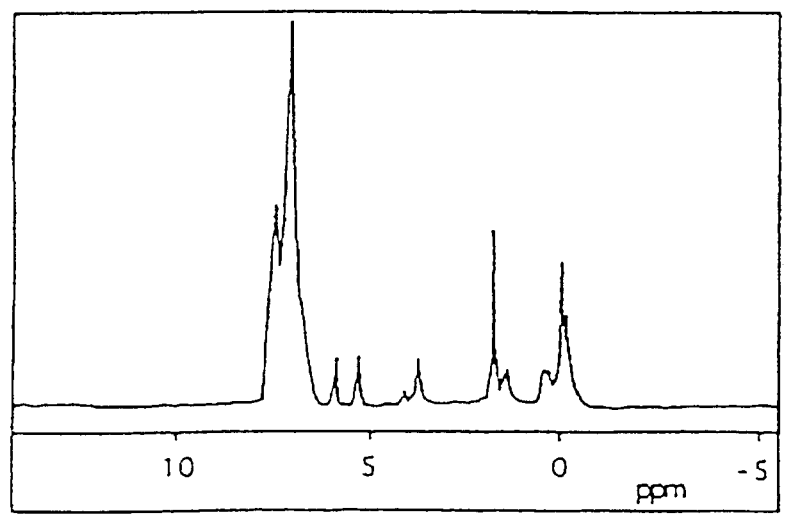
FIG. 10 is the $^1$H-NMR spectrum of the ladder polyphenylsilsesquioxanes containing methacryl group obtained in Example 2 of this invention.

The $^1$H-NMR spectrum was determined and, as shown in FIG. 10, signals of H nuclei in the 3-methacryloyloxypropyldimethylsilyl and phenyl groups were observed. In the $^{29}$Si-MAS·NMR spectrum, a signal of the Si nucleus in the 3-methacryloyloxypropyldimethylsilyl group and that of Si nuclei in the ladder polyphenylsilsesquioxane skeleton were observed respectively at 10.9 ppm and 79.2 ppm at an intensity ratio of 2:32.

EXAMPLE 3

In a reaction vessel were placed 20 parts by weight of the cage octaphenylsilsesquioxane prepared in Supplementary Example 1, 18 parts by weight of 1,3-bis(3-glycidoxypropyl)-1,1,3,3-tetramethyldisiloxane, 80 parts by weight of toluene, and 0.4 part by weight of cesium hydroxide and the mixture was heated at reflux temperature with vigorous stirring for 5 hours. White powders of the cage octaphenylsilsesquioxane did not dissolve in the toluene at first, but they gradually dissolved as the reaction progressed and dissolved completely after 5 hours. The solution was cooled to room temperature, the insoluble unreacted cesium hydroxide was removed by filtration, and the filtrate was poured into 1,000 parts by weight of methanol to precipitate epoxy-terminated silylated polyphenylsilsesquioxanes. The precipitate was collected by filtration and dried in vacuum to give 33 parts by weight of epoxy-terminated ladder silylated polyphenylsilsesquioxanes as white solid.

Figure 11:
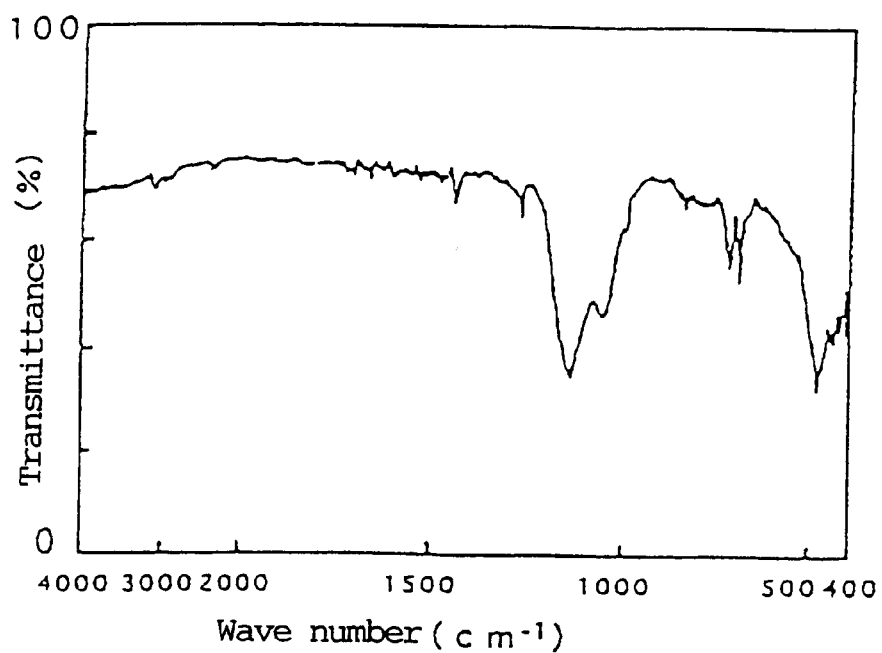
FIG. 11 is the infrared absorption spectrum of the ladder polyphenylsilsesquioxanes containing epoxy group obtained in Example 3 of this invention.

The weight average molecular weight $M_w$ of the product was approximately 2,500 when determined by GPC with polystyrene as standard. The infrared absorption spectrum was determined and, as shown in FIG. 11, absorption bands assignable to Si—$C_6H_5$ were observed at 1595 cm$^{-1}$ and 1430 cm$^{-1}$ while absorption bands assignable to the antisymmetric stretch vibration of Si—O—Si which indicates predominance of a ladder structure for the oligomers in question were observed at 1135 cm$^{-1}$ and 1045 cm$^{-1}$. No absorption band assignable to Si—OH was observed at 3400 cm$^{-1}$.

Figure 12:
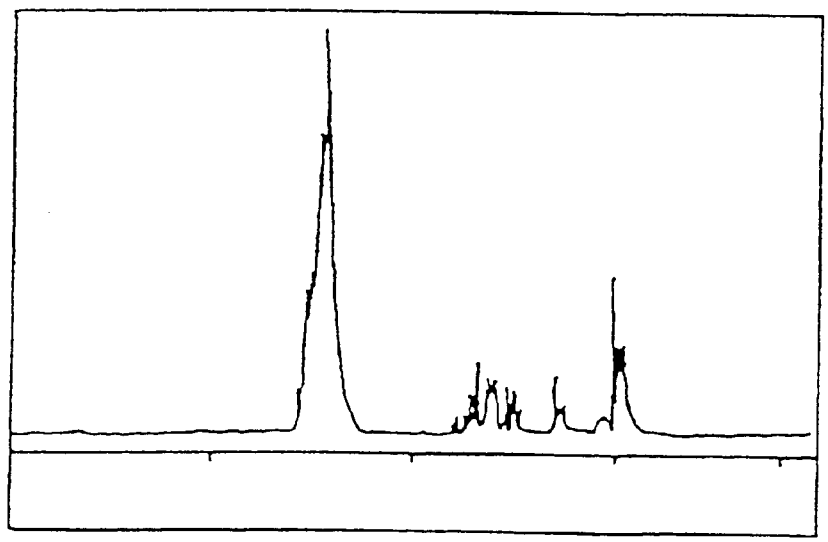
FIG. 12 is the $^1$H-NMR spectrum of the ladder polyphenylsilsesquioxanes containing epoxy group obtained in Example 3 of this invention.

The $^1$H-NMR spectrum was determined and, as shown in FIG. 12, signals of H nuclei in the 3-glycidoxypropyldimethylsilyl and phenyl groups were observed.

EXAMPLE 4

In a reaction vessel were placed 20 parts by weight of the cage octaphenylsilsesquioxane prepared in Supplementary Example 1, 20 parts by weight of 1,3-bis(3-aminopropyl)-1,1,3,3-tetramethyldisiloxane, 80 parts by weight of benzene, and 0.1 part by weight of cesium hydroxide and the mixture was heated at reflux temperature with vigorous stirring for 14 hours. The solution was cooled to room temperature, the insoluble unreacted cesium hydroxide and cage octaphenylsilsesquioxane were removed by filtration, and the filtrate was poured into 1,000 parts by weight of methanol to precipitate amino-terminated silylated polyphenylsilsesquioxanes. The precipitate was collected by filtration and dried in vacuum to give 16 parts by weight of amino-terminated ladder silylated polyphenylsilsesquioxanes as white solid.

Figure 13:
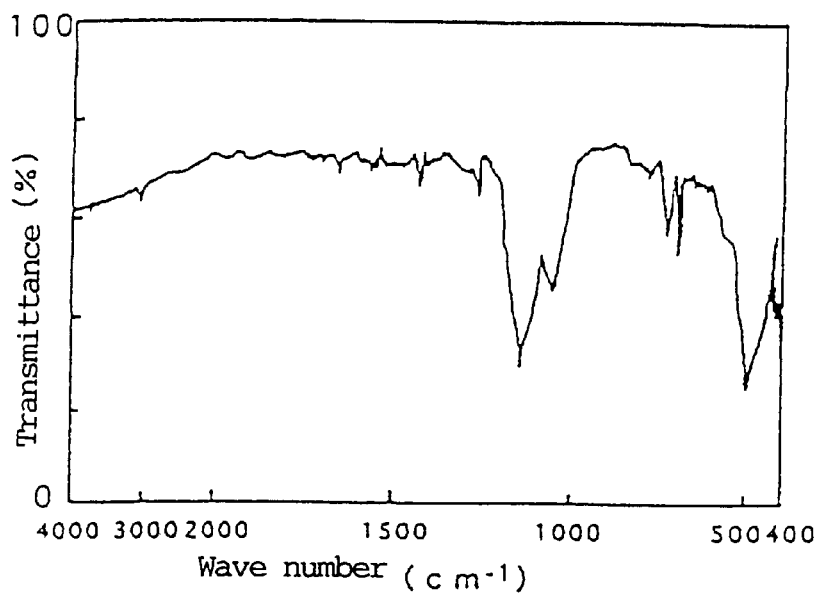
FIG. 13 is the infrared absorption spectrum of the ladder polyphenylsilsesquioxanes containing amino group obtained in Example 4 of this invention.

The weight average molecular weight $M_w$ of the product was approximately 4,000 when determined by GPC with polystyrene as standard. The infrared absorption spectrum was determined and, as shown in FIG. 13, absorption bands assignable to Si—$C_6H_5$ were observed at 1595 cm$^{-1}$ and 1430 cm$^{-1}$ while absorption bands assignable to the antisymmetric stretch vibration of Si—O—Si which indicates predominance of a ladder structure for the oligomers in question were observed at 1135 cm$^{-1}$ and 1045 cm$^{-1}$. No absorption band assignable to Si—OH was observed at 3400 cm$^{-1}$.

Figure 14:
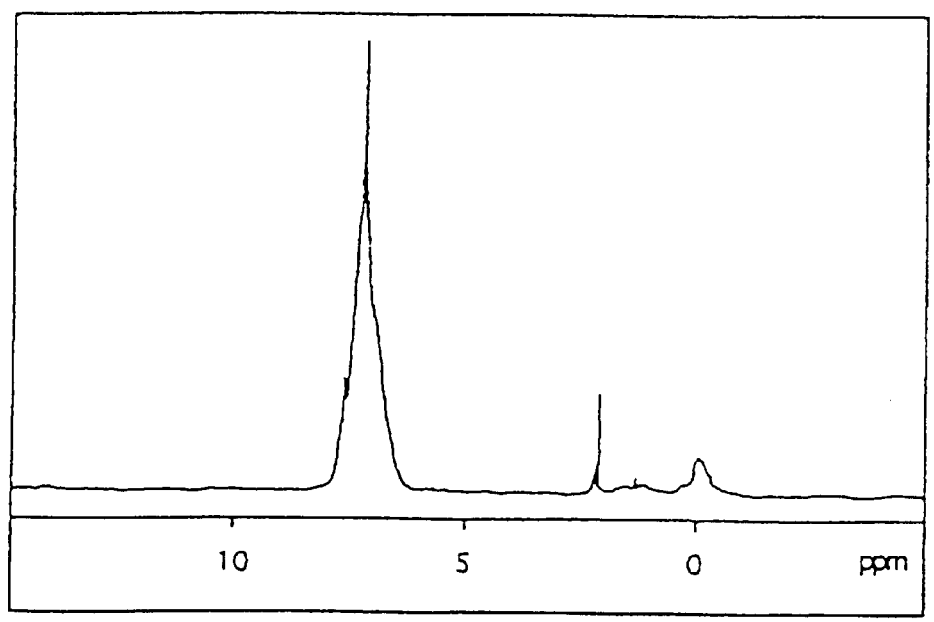
FIG. 14 is the $^1$H-NMR spectrum of the ladder polyphenylsilsesquioxanes containing amino group obtained in Example 4 of this invention.

The $^1$H-NMR spectrum was determined and, as shown in FIG. 14, signals of H nuclei in the 3-aminopropyldimethylsilyl and phenyl groups were observed.

EXAMPLE 5

In 50 parts by weight of xylene were dissolved 10 parts by weight of the silanol-free ladder phenylpolysiloxane prepolymers (having a weight average molecular weight $M_w$ of 4,000 as determined by GPC with polystyrene as standard)

prepared in Supplementary Example 2 and 50 parts by weight of 1,3-bis(3-methacryloyloxypropyl)-1,1,3,3-tetramethyldisiloxane, to the resulting solution were added 5 parts by weight of cesium hydroxide and 0.05 part by weight of a polymerization inhibitor (Methoquinone manufactured by Seiko Kagaku), and the mixture was heated at reflux temperature with stirring for 10 hours. The solution was cooled to room temperature, the insoluble unreacted cesium hydroxide was removed by filtration, and the filtrate was poured into 1,000 parts by weight of n-hexane to precipitate methacryl-terminated silylated polyphenylsilsesquioxanes. The precipitate was collected by filtration and dried in vacuum to give 12 parts by weight of methacryl-terminated ladder silylated polyphenylsilsesquioxanes as white solid.

The weight average molecular weight $M_w$ of the product was approximately 5,000 when determined by GPC with polystyrene as standard. The infrared absorption spectrum was determined and absorption bands assignable to Si—$C_6H_5$ were observed at 1595 cm$^{-1}$ and 1430 cm$^{-1}$ while absorption bands assignable to the antisymmetric stretch vibration of Si—O—Si which indicates a ladder structure for the oligomers in question were observed at 1135 cm$^{-1}$ and 1045 cm$^{-1}$. No absorption band assignable to Si—OH was observed at 3400 cm$^{-1}$.

The $^1$H-NMR spectrum was determined and signals of H nuclei in the 3-methacryloyloxypropyldimethylsilyl and phenyl groups were observed.

EXAMPLE 6

In a reaction vessel were placed 9.6 parts by weight of the cage octaphenylsilsesquioxane prepared in Supplementary Example 1, 4.6 parts by weight of 1,3-bis(vinyl)-1,1,3,3-tetramethyldisiloxane, 50 parts by weight of toluene, and 0.2 part by weight of cesium hydroxide and the mixture was heated at reflux temperature with vigorous stirring for 8.5 hours. The solution was cooled to room temperature, the insoluble unreacted cesium hydroxide and cage octaphenylsilsesquioxane were removed by filtration, and the filtrate was poured into 500 parts by weight of methanol to precipitate vinyl-terminated silylated polyphenylsilsesquioxanes. The precipitate was collected by filtration and dried in vacuum to give 7 parts by weight of vinyl-terminated ladder silylated polyphenylsilsesquioxanes as white solid.

Figure 15:
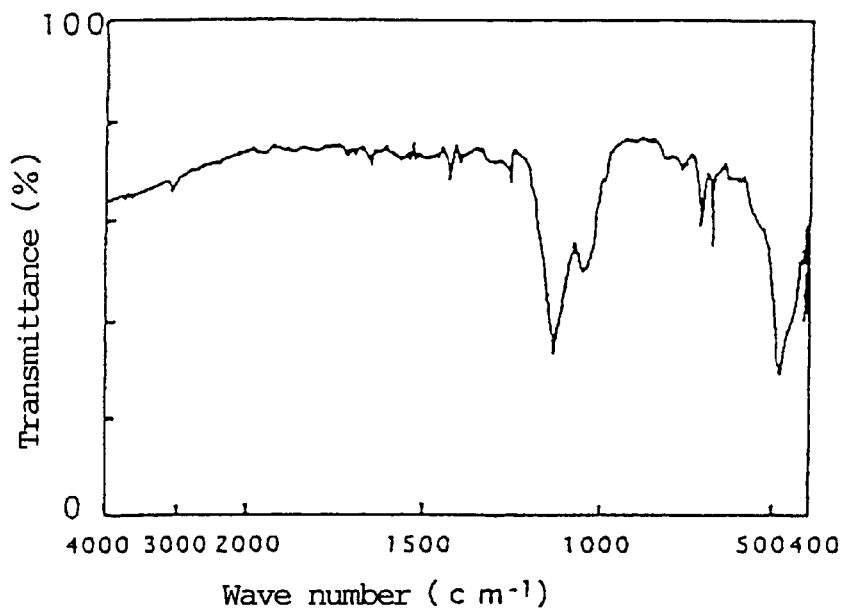
FIG. 15 is the infrared absorption spectrum of the ladder polyphenylsilsesquioxanes containing vinyl group obtained in Example 6 of this invention.

The weight average molecular weight $M_w$ of the product was approximately 3,700 when determined by GPC with polystyrene as standard. The infrared absorption spectrum was determined and, as shown in FIG. 15, absorption bands assignable to Si—$C_6H_5$ were observed at 1595 cm$^{-1}$ and 1430 cm$^{-1}$ while absorption bands assignable to the antisymmetric stretch vibration of Si—O—Si which indicates predominance of a ladder structure for the oligomers in question were observed at 1135 cm$^{-1}$ and 1045 cm$^{-1}$. No absorption band assignable to Si—OH was observed at 3400 cm$^{-1}$.

Figure 16:
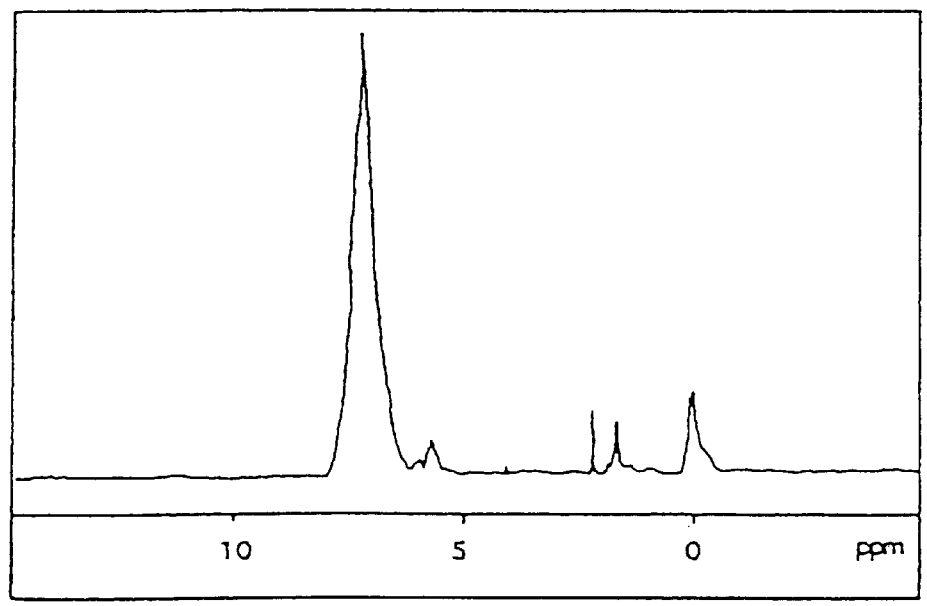
FIG. 16 is the $^1$H-NMR spectrum of the ladder polyphenylsilsesquioxanes containing vinyl group obtained in Example 6 of this invention.

The $^1$H-NMR spectrum was determined and, as shown in FIG. 16, signals of H nuclei in the dimethyl(vinyl)silyl and phenyl groups were observed.

EXAMPLE 7

In a reaction vessel were placed 8 parts by weight of the cage octaphenylsilsesquioxane prepared in Supplementary Example 1, 18 parts by weight of 1,3-bis(3-hydroxypropyl)-1,1,3,3-tetramethyldisiloxane, 32 parts by weight of toluene, and 0.16 part by weight of cesium hydroxide and the mixture was heated at reflux temperature with vigorous stirring for 1 hour. White powders of the cage octaphenylsilsesquioxane did not dissolve in the toluene at first, but they gradually dissolved as the reaction progressed and dissolved completely after 1 hour. The solution was cooled to room temperature, the insoluble unreacted cesium hydroxide was removed by filtration, and the filtrate was poured into a mixture of 100 parts by weight of methanol and 400 parts by weight of water to precipitate hydroxyl-terminated silylated polyphenylsilsesquioxanes. The precipitate was collected by filtration and dried in vacuum to give 10 parts by weight of hydroxyl-terminated ladder silylated polyphenylsilsesquioxanes.

Figure 17:
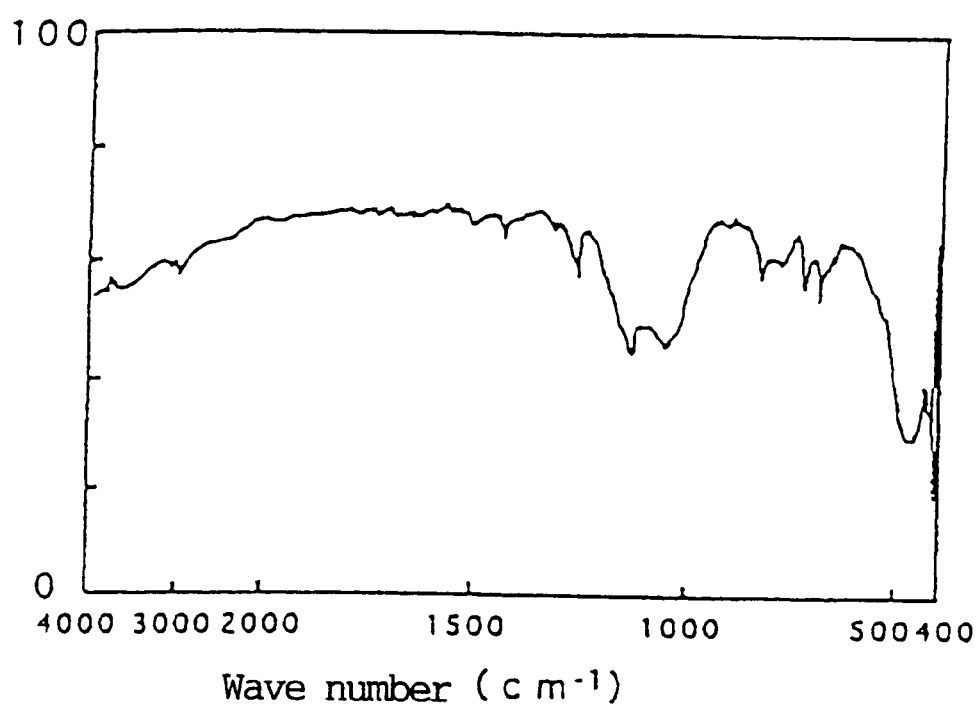
FIG. 17 is the infrared absorption spectrum of the ladder polyphenylsilsesquioxanes containing hydroxyl group obtained in Example 7 of this invention.
Figure 18:
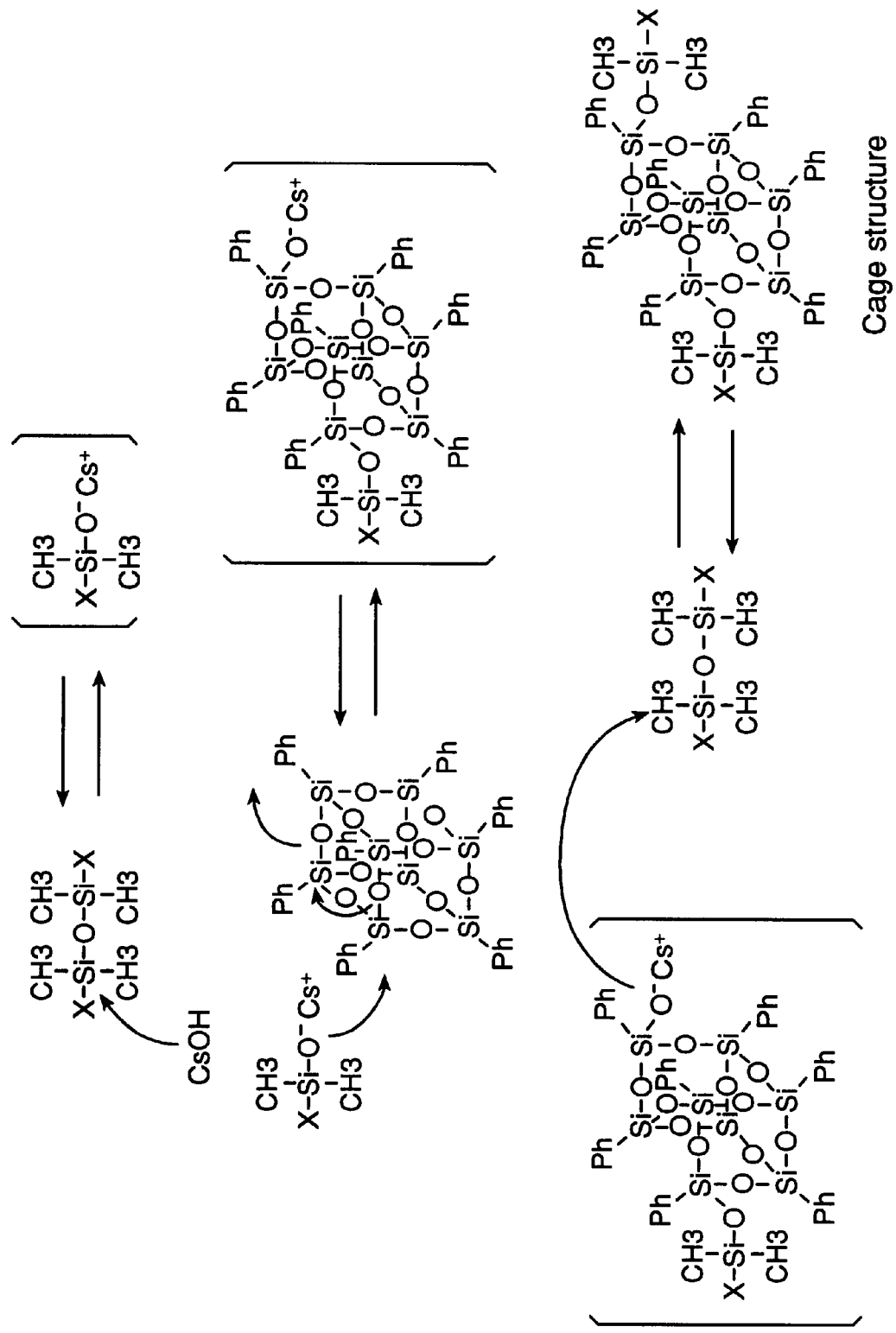
FIG. 18 is reaction formula (7) illustrating a reaction mechanism for forming cage structure polyphenylsilsesquioxanes.
Figure 19:
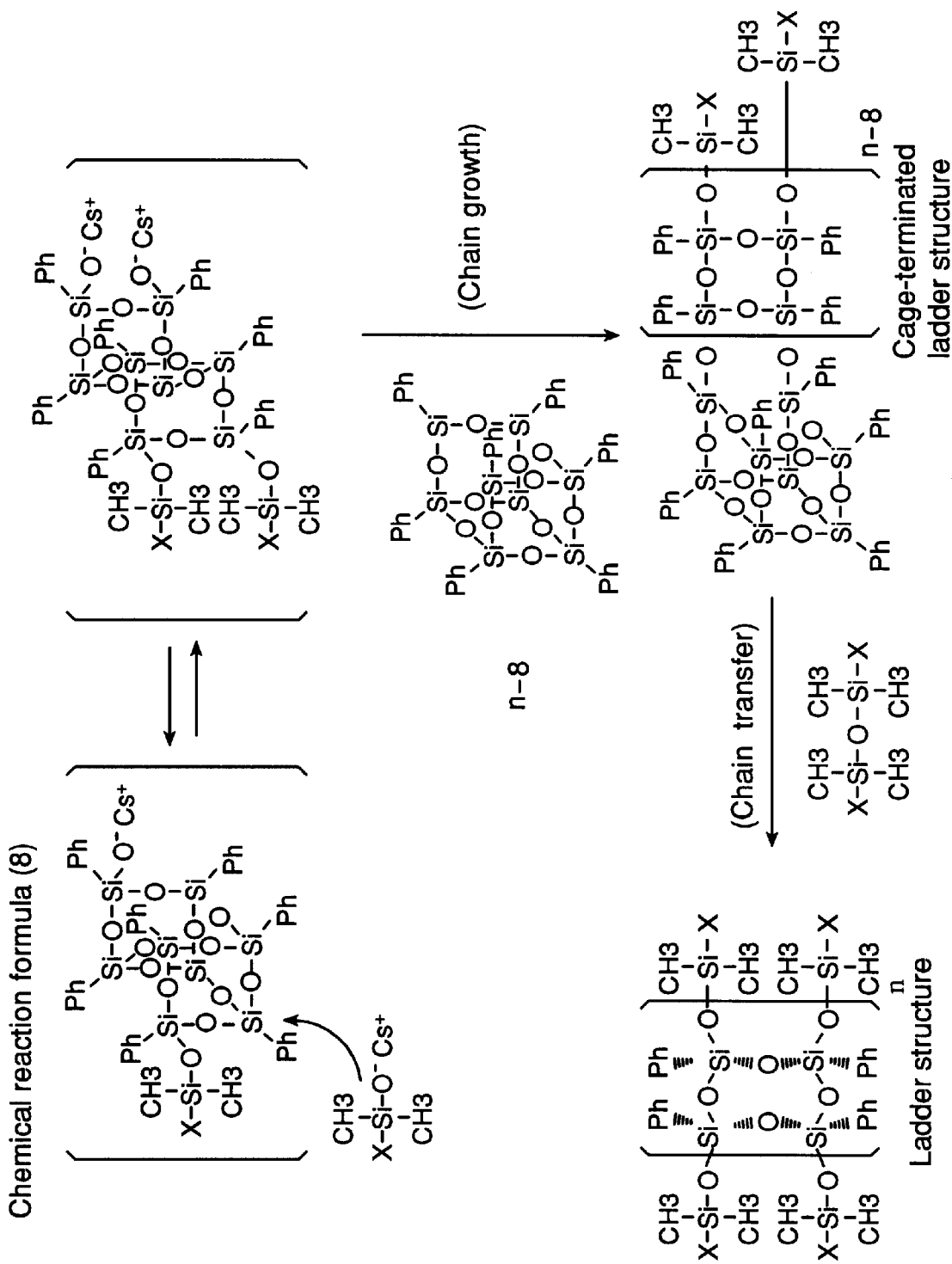
FIG. 19 is reaction formula (8) illustrating a reaction mechanism for forming ladder structure and cage-terminated ladder structure polyphenylsilsesquioxanes.

The weight average molecular weight $M_w$ of the product was approximately 1,400 when determined by GPC with polystyrene as standard. The infrared absorption spectrum was determined and, as shown in FIG. 17, absorption bands assignable to Si—$C_6H_5$ were observed at 1595 cm$^{-1}$ and 1430 cm$^{-1}$ while absorption bands assignable to the antisymmetric stretch vibration of Si—O—Si which indicates predominance of a ladder structure for the oligomers in question were observed at 1135 cm$^{-1}$ and 1045 cm$^{-1}$. No absorption band assignable to Si—OH was observed at 3400 cm$^{-1}$.

The $^1$H-NMR spectrum was determined and signals of H nuclei in the 3-hydroxypropyldimethylsilyl and phenyl groups were observed.

EXAMPLE 8

In 100 parts by weight of o-dichlorobenzene were dissolved 10 parts by weight of the cage-terminated ladder phenylsilsesquioxanes (having a weight average molecular weight $M_w$ of 100,000 as determined by GPC with polystyrene as standard) prepared in Supplementary Example 3 and 50 parts by weight of 1,3-bis(3-aminopropyl)-1,1,3,3-tetramethyldisiloxane, to the resulting solution was added 5 parts by weight of tetramethylammonium hydroxide, and the mixture was heated at reflux temperature with stirring for 12 hours. The solution was cooled to room temperature and poured into 500 parts by weight of n-hexane to precipitate amino-terminated silylated polyphenylsilsesquioxanes. The precipitate was collected by filtration and dried in vacuum to give 9 parts by weight of amino-terminated ladder silylated polyphenylsilsesquioxanes as white solid.

The weight average molecular weight $M_w$ of the product was approximately 100,000 when determined by GPC with polystyrene as standard. The infrared absorption spectrum was determined and absorption bands assignable to Si—$C_6H_5$ were observed at 1595 cm$^{-1}$ and 1430 cm$^{-1}$ while absorption bands assignable to the antisymmetric stretch vibration of Si—O—Si which indicates a ladder structure for the polymers in question were observed at 1135 cm$^{-1}$ and 1045 cm$^{-1}$. No absorption band assignable to Si—OH was observed at 3400 cm$^{-1}$.

The $^1$H-NMR spectrum was determined and signals of H nuclei in the 3-aminopropyldimethylsilyl and phenyl groups were observed.

EXAMPLE 9

In 50 parts by weight of xylene were dissolved 10 parts by weight of the silanol-free ladder phenylpolysiloxane prepolymers (having a weight average molecular weight $M_w$ of 10,000 as determined by GPC with polystyrene as standard) prepared in Supplementary Example 2 and 50 parts by weight of 1,3-bis(3-glycidoxypropyl)-1,1,3,3-tetramethyldisiloxane, to the resulting solution was added 0.05 part by weight of sodium hydroxide, and the mixture was heated at reflux temperature with stirring for 72 hours.

The solution was cooled to room temperature, the insoluble unreacted sodium hydroxide was removed by filtration, and the filtrate was poured into 1,000 parts by weight of acetonitrile to precipitate epoxy-terminated silylated polyphenylsilsesquioxanes. The precipitate was collected by filtration and dried in vacuum to give 13 parts by weight of epoxy-terminated ladder silylated polyphenylsilsesquioxanes as white solid.

The weight average molecular weight $M_w$ of the product was approximately 30,000 when determined by GPC with polystyrene as standard. The infrared absorption spectrum was determined and absorption bands assignable to Si—$C_6H_5$ were observed at 1595 cm$^{-1}$ and 1430 cm$^{-1}$ while absorption bands assignable to the antisymmetric stretch vibration of Si—O—Si which indicates a ladder structure for the polymers in question were observed at 1135 cm$^{-1}$ and 1045 cm$^{-1}$. No absorption band assignable to Si—OH was observed at 3400 cm$^{-1}$.

The $^1$H-NMR spectrum was determined and signals of H nuclei in the 3-glycidoxypropyldimethylsilyl and phenyl groups were observed.

EXAMPLE 10

In a reaction vessel were placed 10 parts by weight of the cage octaphenylsilsesquioxane prepared in Supplementary Example 1, 10 parts by weight of 1,3-bis(3-mercaptopropyl)-1,1,3,3-tetramethyldisiloxane, 40 parts by weight of toluene, and 0.2 part by weight of cesium hydroxide and the mixture was heated at reflux temperature with vigorous stirring for 3 hours. White powders of the cage octaphenylsilsesquioxane did not dissolve in the toluene at first, but they gradually dissolved as the reaction progressed and dissolved completely after 3 hours. The solution was cooled to room temperature, the insoluble unreacted cesium hydroxide was removed by filtration, and the filtrate was poured into a mixture of 100 parts by weight of methanol and 400 parts by weight of water to precipitate mercapto-terminated silylated polyphenylsilsesquioxanes. The precipitate was collected by filtration and dried in vacuum to give 10 parts by weight of mercapto-terminated ladder silylated polyphenylsilsesquioxanes.

The weight average molecular weight $M_w$ of the product was approximately 1,500 when determined by GPC with polystyrene as standard. The infrared absorption spectrum was determined and absorption bands assignable to Si—$C_6H_5$ were observed at 1595 cm$^{-1}$ and 1430 cm$^{-1}$ while absorption bands assignable to the antisymmetric stretch vibration of Si—O—Si which indicates predominance of a ladder structure for the oligomers in question were observed at 1135 cm$^{-1}$ and 1045 cm$^{-1}$. No absorption band assignable to Si—OH was observed at 3400 cm$^{-1}$.

The $^1$H-NMR spectrum was determined and signals of H nuclei in the 3-mercaptopropyldimethylsilyl and phenyl groups were observed.

INDUSTRIAL APPLICABILITY

This invention provides a process for preparing silylated polyphenylsilsesquioxanes containing a variety of terminal reactive functional groups directly in a simple manner without the necessity of prior synthesis of hydroxyl-terminated polyphenylsilsesquioxanes. Moreover, the silylated polyphenylsilsesquioxanes thus prepared do not contain silanol groups inside as defect and branched structure, show excellent storage stability and properties of good reproducibility such as heat resistance and are useful for coating materials for glass, plastics, ceramics, metals, and wood, sealing materials, adhesives, sheet materials as glass substitute, optical fibers, connectors for optical fibers, interlayer insulation membranes, passivation membranes, encapsulating materials, materials relating to liquid crystals such as resins and protective membranes for color filters or base materials for transparent electrodes, equipment for solar system, magnetic bubble memory elements, gas permeation and separation membranes, raw materials and additives for FRP, CFRP, and FRM, and chemically reactive modifiers for a variety of organic polymers.

What is claimed is:

1. A process for preparing silicone compounds in which Si—O— at the end of the molecular chain of silanol-free cage and/or ladder polyphenylsilsesquioxanes represented by formula (1):

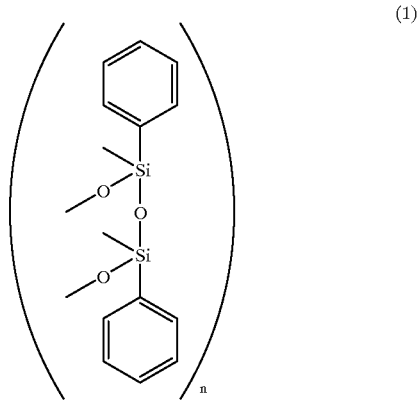

(1)

wherein n is an integer from 2 to 5000, is linked to at least one triorganosilyl group containing reactive functional group X represented by formula (2):

(2)

wherein
X is selected from the group consisting of
(A) $CH_2$=CH—,
(B) $CH_2$=C($R_4$)—COO—$R_3$—,
(C)

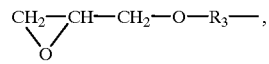

—$CH_2$—O—$R_3$—,
(D) $H_2N$—$R_3$—,
(E) HO—$R_3$—, and
(F) HS—$R_3$—,
$R_3$ is an alkylene group containing 1 to 3 carbon atoms, and
$R_4$ is a hydrogen atom or a methyl group,
said process comprising:
subjecting cage-terminated and silanol-free cage and/or ladder polyphenylsilsesquioxanes to an equilibrium reaction under heat with a disiloxane containing reactive functional groups represented by formula (3):

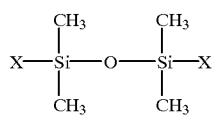

wherein X is the same as defined above, in an organic solvent in the presence of an alkaline rearrangement and condensation catalyst.

2. The process according to claim 1, wherein one or more silicone compounds selected from the group consisting of ladder, cage, and unilaterally cage-terminated ladder polyphenylsilsesquioxanes are present, and wherein said silicone compounds each possess a weight average molecular weight $M_w$ of 800 to 1000000 when determined by GPC with polystyrene as a standard.

* * * * *